UNITED STATES PATENT OFFICE.

HENRI RAYMOND VIDAL, OF PARIS, FRANCE.

PROCESS OF MAKING VIOLET DYES.

SPECIFICATION forming part of Letters Patent No. 608,354, dated August 2, 1898.

Application filed December 28, 1897. Serial No. 664,084. (No specimens.) Patented in France March 10, 1897, No. 264,867, and in England March 13, 1897, No. 6,694.

*To all whom it may concern:*

Be it known that I, HENRI RAYMOND VIDAL, of Paris, France, have invented a new and useful Improvement in Coloring-Matters, which improvement is fully set forth in the following specification, and which has been patented in France, No. 264,867, March 10, 1897, and in Great Britain, No. 6,694, March 13, 1897.

This invention has for its object the production of coloring-matters by reacting on parasulfanilic acid with diamins, one to four, of benzene and naphthalene.

Example: I heat in an oil-bath in an iron vessel to a temperature of from 170° to 225° centigrade, or thereabout, the vessel being provided with an agitator, parasulfanilic acid, 17.3 kilograms; paraphenylenediamin, 10.8 kilograms. The mixture becomes liquefied, and I finally obtain, after boiling from two to three hours, a mass of violet color. The formation of the mass by stopping the agitator indicates the end of the reaction. The coloring-matter thus produced is soluble in acids, giving a violet coloration, and in alkalies giving a violet black.

This coloring-matter dyes vegetable and animal fiber without mordant dark violet.

In the preceding reaction I may substitute for the paraphenylenediamin the corresponding diamin of the naphthalene series.

Example: I heat, as before, parasulfanilic acid, 17.3 kilograms; naphthalenediamin, one to four, 15.8 kilograms. On liquefication of the mass I obtain after two to three hours a violet mass which, by stopping the agitator, indicates the end of the reaction. The coloring-matter thus obtained has properties analogous to the preceding.

Having thus described my invention, what I claim as new, and desire to secure by Letters Patent, is—

The process of making violet coloring-matters by heating parasulfanilic acid with diamins one to four of benzene and naphthalene, substantially as described.

In testimony whereof I have signed this specification in the presence of two subscribing witnesses.

HENRI RAYMOND VIDAL.

Witnesses:
   EDWARD P. MACLEAN,
   ANTOINE ROUSSANNES.